United States Patent
Cole et al.

(10) Patent No.: US 7,224,869 B2
(45) Date of Patent: May 29, 2007

(54) LOW LOSS ELECTRODES FOR ELECTRO-OPTIC MODULATORS

(75) Inventors: James H. Cole, Great Falls, VA (US); Robert P. Moeller, Ft. Washington, MD (US); Marta M. Howerton, Fairfax Station, VA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/080,974

(22) Filed: Mar. 14, 2005

(65) Prior Publication Data

US 2005/0201686 A1    Sep. 15, 2005

Related U.S. Application Data

(60) Provisional application No. 60/556,012, filed on Mar. 12, 2004.

(51) Int. Cl.
*G02B 6/26* (2006.01)
*G02B 6/42* (2006.01)

(52) U.S. Cl. ................................. 385/40; 385/8; 385/9

(58) Field of Classification Search .................. 385/3, 385/8, 9, 14, 40
See application file for complete search history.

(56) References Cited

U.S. PATENT DOCUMENTS

| | | |
|---|---|---|
| 5,153,930 A | 10/1992 | DuPuy |
| 5,189,713 A | 2/1993 | Shaw |
| 5,388,170 A | 2/1995 | Heismann |
| 5,416,859 A | 5/1995 | Burns |
| 5,442,719 A | 8/1995 | Chang |
| 5,497,233 A | 3/1996 | Meyer |
| 5,712,935 A | 1/1998 | Miyakawa |
| 5,953,466 A | 9/1999 | Kubota |
| 6,016,198 A | 1/2000 | Burns |

(Continued)

OTHER PUBLICATIONS

W.K. Burns, M.M. Howerton, R.P. Moeller, R.W. McElhanon, A.S. Greenblatt, "Broadband reflection traveling-wave LiNbO3 modulator", OFC '98 Technical Digest, 1998, pp. 284-285.

(Continued)

*Primary Examiner*—Sung Pak
*Assistant Examiner*—Daniel Petkovsek
(74) *Attorney, Agent, or Firm*—John J. Karasek; Sally A. Ferrett

(57) ABSTRACT

An electro-optic modulator includes a substrate, at least two parallel optical waveguides, at least one ground plane, at least one active electrode with at least two lower portions of the active electrode, and an upper portion connected to the lower portions, the lower portions spaced apart from each other, each of the two lower portions of the active electrode extending over one of the optical waveguides. An electro-optic phase modulator having at least one optical waveguide and at least one active electrode formed on a face of the substrate, the active electrode having a wider upper portion and a narrower lower portion, the lower portions of the active electrode aligned with and extending over one of the optical waveguides. A bridge electrode has at least one narrower lower portion, and a wider upper portion, the lower portion for being arranged over an optical waveguide formed in a substrate.

36 Claims, 10 Drawing Sheets

U.S. PATENT DOCUMENTS

| | | | |
|---|---|---|---|
| 6,128,424 | A | 10/2000 | Gampp |
| 6,304,685 | B1 | 10/2001 | Burns |
| 6,356,673 | B1 | 3/2002 | Burns et al. |
| 6,381,379 | B1 | 4/2002 | Burns et al. |
| 6,393,166 | B1 | 5/2002 | Burns |
| 6,501,867 | B2 * | 12/2002 | Gates et al. ............ 385/2 |
| 6,522,793 | B1 | 2/2003 | Szilagyi |
| 6,526,186 | B2 | 2/2003 | Burns |
| 6,535,320 | B1 | 3/2003 | Burns |
| 6,600,843 | B2 | 7/2003 | Sriram |
| 6,760,493 | B2 * | 7/2004 | Pruneri et al. ............ 385/8 |
| 6,845,183 | B2 * | 1/2005 | Cheung et al. ............ 385/2 |
| 6,862,387 | B2 | 3/2005 | Howerton |
| 7,024,057 | B2 * | 4/2006 | Li et al. ............ 385/3 |
| 7,058,241 | B2 * | 6/2006 | Sugiyama et al. ............ 385/4 |
| 2003/0228081 | A1 | 12/2003 | Tavlykaev |
| 2004/0061918 | A1 | 4/2004 | Pruneri |
| 2004/0066549 | A1 | 4/2004 | Kiehne |
| 2004/0067021 | A1 | 4/2004 | Miyama |
| 2004/0095628 | A1 | 5/2004 | Seino |
| 2004/0114845 | A1 | 6/2004 | Cheung |
| 2004/0136634 | A1 | 7/2004 | Chowdhury |
| 2004/0145797 | A1 | 7/2004 | Aoki |
| 2004/0151414 | A1 | 8/2004 | Cheung |
| 2004/0202395 | A1 | 10/2004 | Yap et al. |
| 2004/0240036 | A1 | 12/2004 | Porte |
| 2004/0240790 | A1 | 12/2004 | Gopinath |
| 2004/0247220 | A1 | 12/2004 | Bosso |
| 2004/0264832 | A1 | 12/2004 | Kondo |

OTHER PUBLICATIONS

Wooten, E.L. Kissa, K.M., Yi-Yan, A., Murphy, E.J., Lafaw, D.A., Hallemeier, P.F., Maack, D., Attanasio, D.V., Fritz, D.J., McBrien, G.J., Bossi, D.E.,"A review of Lithium Niobate Modulators for Fiber-Optic Communications Systems," IEEE Journal of Selected Topics in Quantum Mechanics, vol. 6, No. 1, pp. 69-82, Jan./Feb. 2000.

W.K. Burns, M.M. Howerton, R.P. Moeller, R.W. McElhanon, A.S. Greenblatt, "Reflection Traveling Wave LiNbO3 Modulator for Low Vπ Operation," LEOS 1997, IEEE, pp. 60-61.

W.K. Burns, M.M. Howerton, R.P. Moeller, A.S. Greenblatt, R.W. McElhanon, "Broad-Band Reflection Traveling-Wave LiNbO3 Modulator," IEEE Photonic Technology Letters, vol. 10, No. 6, Jun. 1998, pp. 805-806.

W.K. Burns, M.M. Howerton, R.P. Moeller, R. Krahenbuhl, R.W. McElhanon, and A.S. Greenblatt, "Low-Drive Voltage, Broad-Band LiNbO3 Modulators with and Without Etched Ridges," Journal of Lightwave Technology, vol. 17, No. 12, Dec. 1999, pp. 2551-2555.

M.M. Howerton, R.P. Moeller, A.S. Greenblatt, and R. Krahenbuhl, "Fully Packaged, Broad-band LiNbO3 Modulator with Low Drive Voltage", IEEE Photonics Technology Letters, vol. 12, No. 7, Jul. 2000, pp. 792-794.

M. Sugiyama, M. Doi, S. Taniguchi, T. Nakazawa, and H. Onaka, "Driver-less 40 Gb/s LiNbO3 Modulator with Sub-1 V Drive Voltage", OFC 2002, pp. FB6-2-FB6-4.

Integrated optical photonic RF phase shifters are disclosed in E. Voges, K. Kuckelhaus, and B. Hosselbarth, "True time delay integrated optical RF phase shifters in lithium niobate", Electronics Letters, vol. 33, No. 23, 1997, pp. 1950-1951.

W.K. Burns, M.M. Howerton, and R.P. Moeller, "Performance and Modeling of Proton Exchanged LiTaO3 Branching Modulators", Journal of Lightwave Technology, vol. 10, No. 10, Oct. 1992, pp. 1403-1408.

M.M. Howerton, R.P. Moeller, and J.H. Cole, "Subvolt Broadband Lithium Niobate Modulators" 2002 NRL Review, pp. 177-178.

R. Krahenbuhl and M.M. Howerton, "Investigations on Short-Path-Length High-Speed Optical Modulators in LiNbO3 with Resonant-Type Electrodes", Journal of Lightwave Technology, vol. 19, No. 9, Sep. 2001, pp. 1287-1297.

W.K. Burns, M.M. Howerton, R.P. Moeller, R.W. McElhanon, and A.S. Greenblatt, "Low Drive Voltage, 40 GHz LiNbO3 Modulators", OFC '99, pp. 284-286.

* cited by examiner

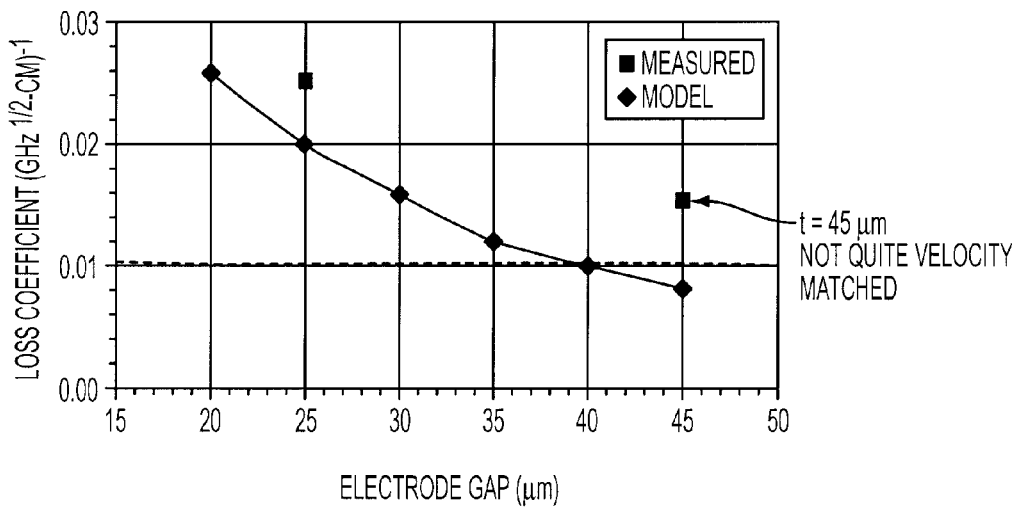
FIG. 8
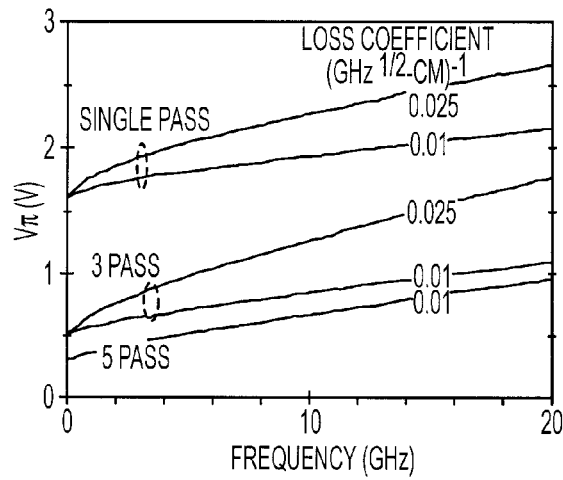
FIG. 9
MODEL AT 1.55 μm
| PASSES | LOSS COEFFICIENT (GHz$^{1/2}$-CM)$^{-1}$ | Vπ (V) DC | Vπ (V) 20 GHz |
|---|---|---|---|
| 1 | 0.025 | 1.6 | 2.6 |
| 1 | 0.01 | 1.6 | 2.1 |
| 3 | 0.025 | 0.5 | 1.8 |
| 3 | 0.01 | 0.5 | 1.1 |
| 5 | 0.015* | 0.3 | 1.2 |
| 5 | 0.01 | 0.3 | 0.9 |
*CURRENT LOSS COEFFICIENT, 45 μm GAP
FIG. 10

LOW LOSS ELECTRODES FOR ELECTRO-OPTIC MODULATORS

CROSS REFERENCE TO RELATED APPLICATIONS

This application claims the benefit of U.S. Provisional application No. 60/556,012, filed in the U.S. on Mar. 12, 2004, the disclosure of which is incorporated by reference herein in its entirety.

BACKGROUND

1. Field of the Invention

This application is related to electro-optic modulators and electrodes for use in electro-optic modulators.

2. Description of Related Art

Electrooptic devices, such as optical modulators, have the ability to change a particular characteristic of an optical signal, such as its intensity, phase, or polarization. Electro-optic modulators, particularly lithium niobate ($LiNbO_3$) modulators, have application in radio frequency analog links, digital communications and electric field sensing. Electro-optic modulators are useful for modulating an optical signal in a waveguide with an RF or other frequency electrical signal.

A variety of electro-optic modulators are disclosed in Wooten, E. L, Kissa, K. M., Yi-Yan, A., Murphy, E. J., Lafaw, D. A., Hallemeier, P. F., Maack, D., Attanasio, D. V., Fritz, D. J., McBrien, G. J., Bossi, D. E., "A review of Lithium Niobate Modulators for Fiber-Optic Communications Systems," IEEE Journal of Selected Topics in Quantum Mechanics, Vol. 6, No. 1, 2000.

Electro-optic modulators formed in x-cut and z-cut lithium niobate are disclosed in U.S. Pat. No. 5,416,859 to Burns et al., U.S. Pat. No. 6,016,198 to Burns et al., U.S. Pat. No. 6,304,685 to Burns, U.S. Patent Application Publication No. 2004/0061918 A1, U.S. Patent Application Publication No. 2004/0095628 A1, U.S. Patent Application Publication No. 2004/0136634 A1, U.S. Patent Application Publication No. 2004/0151414 A1, U.S. Pat. No. 5,388,170, U.S. Pat. No. 5,712,935, U.S. Pat. No. 6,522,793, U.S. Pat. No. 6,600,843, U.S. Patent Application Publication No. 2004/0114845 A1, U.S. Pat. No. 5,153,930, U.S. Patent No. 5,189,713, U.S. Pat. No. 5,953,466, U.S. Pat. No. 6,501,867, U.S. Patent Application Publication No. 2004/0066549, U.S. Patent Application Publication No. 2004/0145797, and U.S. Patent Application Publication No. 2003/0228081. Electro-optic devices with a lithium niobate substrate are also disclosed in U.S. Patent Application Publication No. 2004/0202395, U.S. Patent Application Publication No. 2004/0240036, U.S. Patent Application Publication No. 2004/0240790, U.S. Patent Application Publication No. 2004/0247220, U.S. Patent Application Publication No. 2004/0264832, U.S. Pat. No. 5,442,719, U.S. Pat. No. 5,497,233, U.S. Pat. No. 6,128,424, and U.S. Patent Application Publication No. 2004/0067021.

Reflection traveling-wave interferometric modulators are disclosed in W. K. Burns, M. M. Howerton, R. P. Moeller, R. W. McElhanon, A. S. Greenblatt, "Broadband reflection traveling-wave LiNbO3 modulator", OFC '98 Technical Digest, 1998, pp. 284-285, and in W. K. Burns, M. M. Howerton, R. P. Moeller, R. W. McElhanon, A. S. Greenblatt, "Reflection Traveling Wave LiNbO3 Modulator for Low Vπ Operation," LEOS 1997, IEEE p 60-61, and in W. K. Burns, M. M. Howerton, R. P. Moeller, A. S. Greenblatt, R. W. McElhanon, "Broad-Band Reflection Traveling-Wave LiNbO3 Modulator," IEEE Photonic Technology Letters, Vol. 10, No. 6, June 1998, pp. 805-806.

Mach-Zehnder traveling-wave electro-optic modulators with waveguides formed in a z-cut lithium niobate substrate are disclosed in W. K. Burns, M. M. Howerton, R. P. Moeller, R. Krahenbuhl, R. W. McElhanon, and A. S. Greenblatt, "Low-Drive Voltage, Broad-Band $LiNbO_3$ Modulators with and Without Etched Ridges," Journal of Lightwave Technology, Vol. 17, No. 12, December 1999, pp. 2551-2555 and in M. M. Howerton, R. P. Moeller, A. S. Greenblatt, and R. Krahenbuhl, "Fully Packaged, Broadband $LiNbO_3$ Modulator with Low Drive Voltage", IEEE Photonics Technology Letters, Vol. 12, No. 7, Jul. 2000, pp. 792-794. A 40 Gb/s Mach-Zehnder modulator with traveling wave electrode is disclosed in M. Sugiyama, M. Doi, S. Taniguchi, T. Nakazawa, and H. Onaka, "Driver-less 40 Gb/s $LiNbO_3$ Modulator with Sub-1 V Drive Voltage", OFC 2002, FB6-2-FB6-4.

Integrated optical photonic RF phase shifters are disclosed in E. Voges, K. Kuckelhaus, and B. Hosselbarth, "True time delay integrated optical RF phase shifters in lithium niobate", Electronics Letters, Vol. 33, No. 23, 1997, pp. 1950-1951.

Waveguide horns for use in electro-optic modulators are disclosed in U.S. Pat. No. 6,356,673 to Burns et al. Electrodes suitable for use in electro-optic modulators are disclosed in U.S. Pat. No. 6,381,379 to Burns et al. Additional electro-optic modulators are disclosed in U.S. Pat. No. 6,393,166 to Burns, U.S. Pat. No. 6,526,186 to Burns, and U.S. Pat. No. 6,535,320 to Burns.

Lithium-tantalate based electro-optic modulators are discussed in W. K. Burns, M. M. Howerton, and R. P. Moeller, "Performance and Modeling of Proton Exchanged LiTaO3 Branching Modulators", Journal of Lightwave Technology, Vol. 10, No. 10, October 1992, pp. 1403-1408.

Multiple-pass reflective electro-optic modulators are disclosed in commonly assigned patent application Ser. No. 10/165,940, now issued as U.S. Pat. No. 6,862,387, incorporated by reference in its entirety, and in M. M. Howerton, R. P. Moeller, and J. H. Cole, "Subvolt Broadband Lithium Niobate Modulators" 2002 NRL Review, pp 177-178. The low-loss compact turns increase the active length of a modulator and achieve a reduction in drive voltage Vπ without sacrificing a great deal of space on the substrate material.

Electrodes for use in lithium niobate modulators are also discussed in R. Krahenbuhl and M. M. Howerton, "Investigations on Short-Path-Length High-Speed Optical Modulators in $LiNbO_3$ with Resonant-Type Electrodes", Journal of Lightwave Technology, Vol. 19, No. 9, September 2001, pp. 1287-1297.

Mach Zehnder interferometers with etched ridges between the electrodes and waveguides are disclosed in W. K. Burns, M. M. Howerton, R. P. Moeller, R. W. McElhanon, and A. S. Greenblatt, "Low Drive Voltage, 40 GHz $LiNbO_3$ Modulators", OFC '99, pp 284-286.

SUMMARY

An embodiment of the invention is directed to an electro-optic modulator comprising: a substrate having at least two parallel optical waveguides formed on a first face of the substrate; at least one active electrode formed on the first face of the substrate; at least one ground plane formed on the first face of the substrate spaced apart from the active electrode; the active electrode having at least two lower portions of the active electrode proximal to the substrate, and an upper portion connected to the lower portions, the lower portions spaced apart from each other, each of the two lower portions of the active extending over one of the optical waveguides.

The electro-optic modulator can be a Mach-Zehnder modulator. One of the two optical waveguides can be reversed poled compared to another of the two optical waveguides. The two optical waveguides can be joined at each end by a y-branch.

In one embodiment, ground planes are arranged on opposite sides of the active electrode. The gap between the spaced apart lower portions of the active electrode can be filled with an electrical insulator, such as a polymer.

An upper portion of the active electrode can have a width about equal to the width of the optical waveguides plus the width of the gap between the optical waveguides.

One embodiment of the modulator has zero chirp.

The substrate can be lithium niobate, and in one embodiment is z-cut lithium niobate. A buffer layer of an electrical insulator such as silicon dioxide can be arranged formed on the substrate between the optical waveguides and the electrodes.

The parallel optical waveguides can be formed by titanium diffusion into the substrate. A groove can be etched in the substrate between the optical waveguides. The grooves can be etched in the substrate surface between the active electrode and the ground plane. The grooves in the substrate can be etched into the substrate before one of the optical waveguides is reverse-poled, or after one of the optical waveguides is reverse-poled.

In another embodiment of the invention, the optical waveguides, the active electrode, and the ground plane extend from an active region into a bend region, the bend region having a reflector arranged at an end of the optical waveguides, the active electrode and the ground plane having a thickness in the bend region less than a thickness in an active portion of the optical waveguides. The modulator can include 0-5 or more 180 degree bend regions. In an embodiment, the substrate is etched in the linear active regions between the bend regions and is not etched in the bend region. Another embodiment of the invention is directed to a phase modulator having a substrate with at least one optical waveguide formed on a first face of the substrate; at least one active electrode formed on the first face of the substrate aligned over the optical waveguide; the active electrode having at least one narrower lower portion and wider upper portion having a width and height sufficient to match or nearly match velocities of a signal in the optical waveguide and of a RF signal in the active electrode, the active electrode having a height that is at least 5 times as large as the width of the lower portion, the active electrode operating to induce a refractive index change in the optical waveguide.

Another embodiment of the invention is directed to an electrode for inducing an index change in an optical waveguide of an electro-optic modulator, including a first elongated portion having a length greater than its width and height; and a second elongated portion electrically coupled to the first portion, the second portion having a width at least twice the width of the first portion. Another embodiment of the invention is directed to an electrode for inducing an index change in each of two optical waveguide arms of a Mach-Zehnder modulator (MZM) having a first and a second elongated parallel portions separated by a gap, and a third portion electrically coupled to the first and second elongated parallel portions, the third portion having a width at least equal to the sum of the first and second portions and the gap.

BRIEF DESCRIPTION OF THE DRAWINGS

A more complete appreciation of the invention will be readily obtained by reference to the following example embodiments and the accompanying drawings.

FIG. 8 illustrates the electrode loss versus electrode gap for coplanar waveguide structures.

FIG. 9 illustrates the projected drive voltage versus frequency for coplanar waveguide structures.

FIG. 10 illustrates the loss coefficient, dc drive voltage $V\pi$ (DC) and 20 GHz drive voltage $V\pi$ (20 GHz) for coplanar waveguide structures.

DETAILED DESCRIPTION

When configured as MZMs, the electro-optic modulators and electrode structures described herein are useful for amplitude modulation of optical signals. The electrode structures described herein are also suitable for electro-optic phase modulators.

A waveguide is formed of a substrate material and a conveying medium. The substrate can be made of any suitable material, including ferroelectric materials such as lithium niobate, suitable for titanium diffused or proton exchange waveguides; lithium tantalate ($LiTaO_3$), which is typically used with proton exchange waveguides; barium titanate ($BaTiO_3$); strontium barium niobate ($SrBaNbO_3$); various polymers; and semiconductor materials such as indium gallium arsenide phosphide (InGaAsP), indium phosphide (InP), gallium arsenide (GaAs), and gallium aluminum arsenide (GaAlAs). The conveying medium can be any suitable material which has a higher refractive index than the substrate after formation of the optical waveguide. Since lithium niobate has good long term stability, low optical loss, a strong electro-optic coefficient, and the ability to operate at high frequencies, the description that follows will be made in the context of titanium-diffused waveguides in lithium niobate substrates, although it should be understood that other materials can be used.

An embodiment of the invention herein provides an electro-optic device, and specifically, a Mach-Zehnder modulator with an extremely low-loss electrode. The low-loss electrodes described herein are desired for high frequency applications and allow the incorporation of recently developed low-loss, integrated compact turns described in U.S. Pat. No. 6,862,387, suitable for interconnecting multiple devices or regions on the same chip, increasing the device active length, and increasing the device density. Compact turns in an integrated optic modulator allows an increase in the active length of the modulator without sacrificing a great deal of space on the substrate material. The drive voltage at dc is inversely proportional to the device length. Accordingly, compact turns also provide a means for achieving a desirable reduction in drive voltage.

An embodiment of the invention includes a low-loss electrode structure that provides extremely low electrical loss. The low-loss electrode structure is useful in electro-optic devices with long active lengths, since an increase in active length increases the overall electrode loss.

Figure 1:
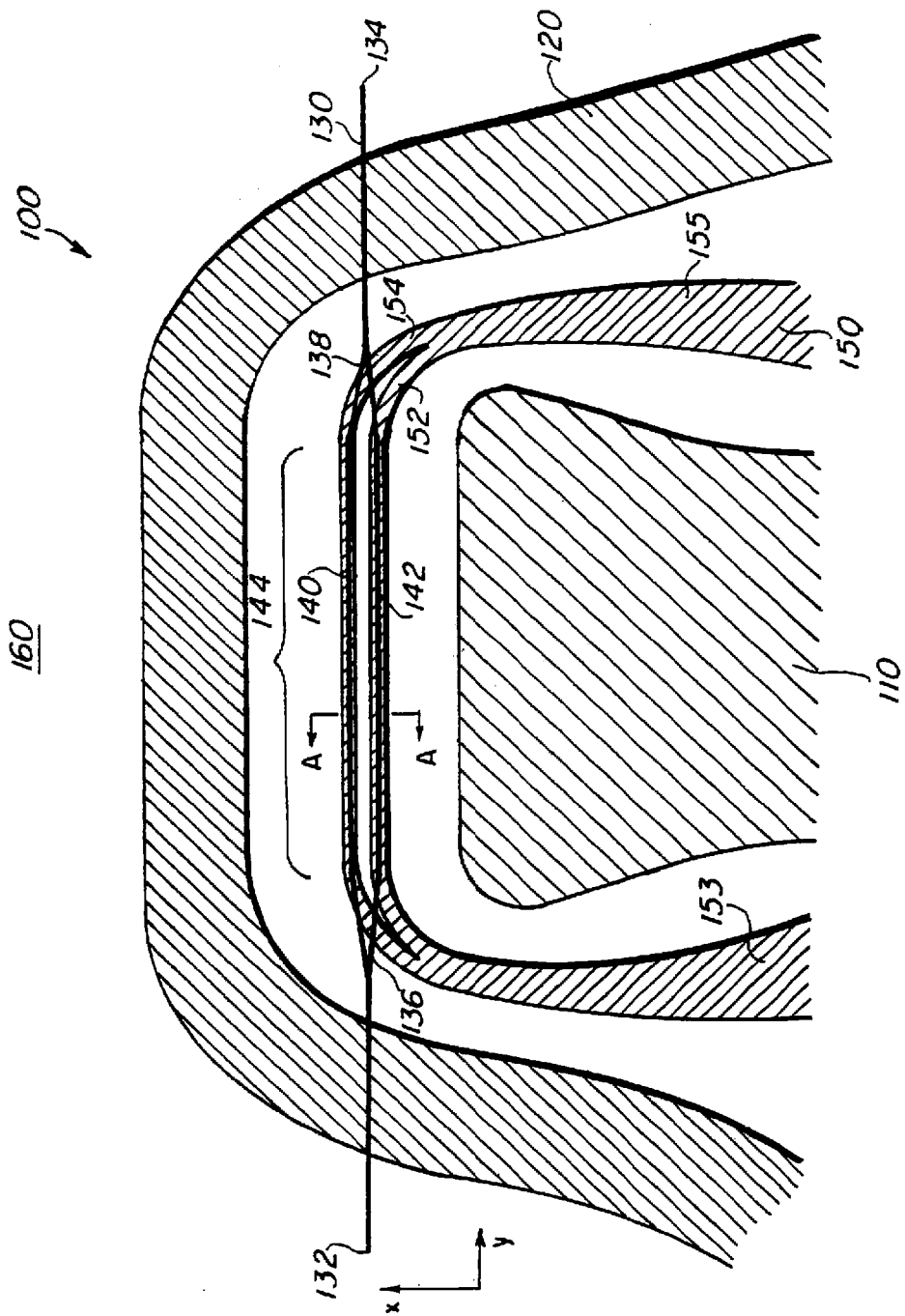
FIG. 1 is a plan view of an electro-optic modulator according to a first embodiment of the invention.

FIG. 1 illustrates a single pass electro-optic Mach-Zehnder modulator 100 in accordance with an exemplary embodiment of the invention. The modulator includes optical waveguides formed in a substrate and electrodes arranged to induce index changes in the optical waveguides. A single hot input electrode receives a RF signal from a coplanar waveguide input horn. The base layer of the hot input electrode is split into two electrodes that are approximately the same width as the two optical waveguide arms of the modulator. A wider upper portion of the hot electrode electrically connects the lower electrode portions. The RF input signal in the electrode portions overlying the optical waveguide arms induces index changes in the optical waveguides arms. The electrode is designed such that the velocity of the RF signal traveling down the electrodes matches, as closely as possible, the velocity of the optical wave traveling within the waveguide under the electrode. One of the optical waveguide arms is reverse poled relative to the other waveguide arm. Thus, the in-phase RF input signal traveling through the electrode induces opposite phase shifts in the optical waveguide arms. Further details are provided in the following paragraphs. Note that FIG. 1-5 are not to scale.

Figure 2:
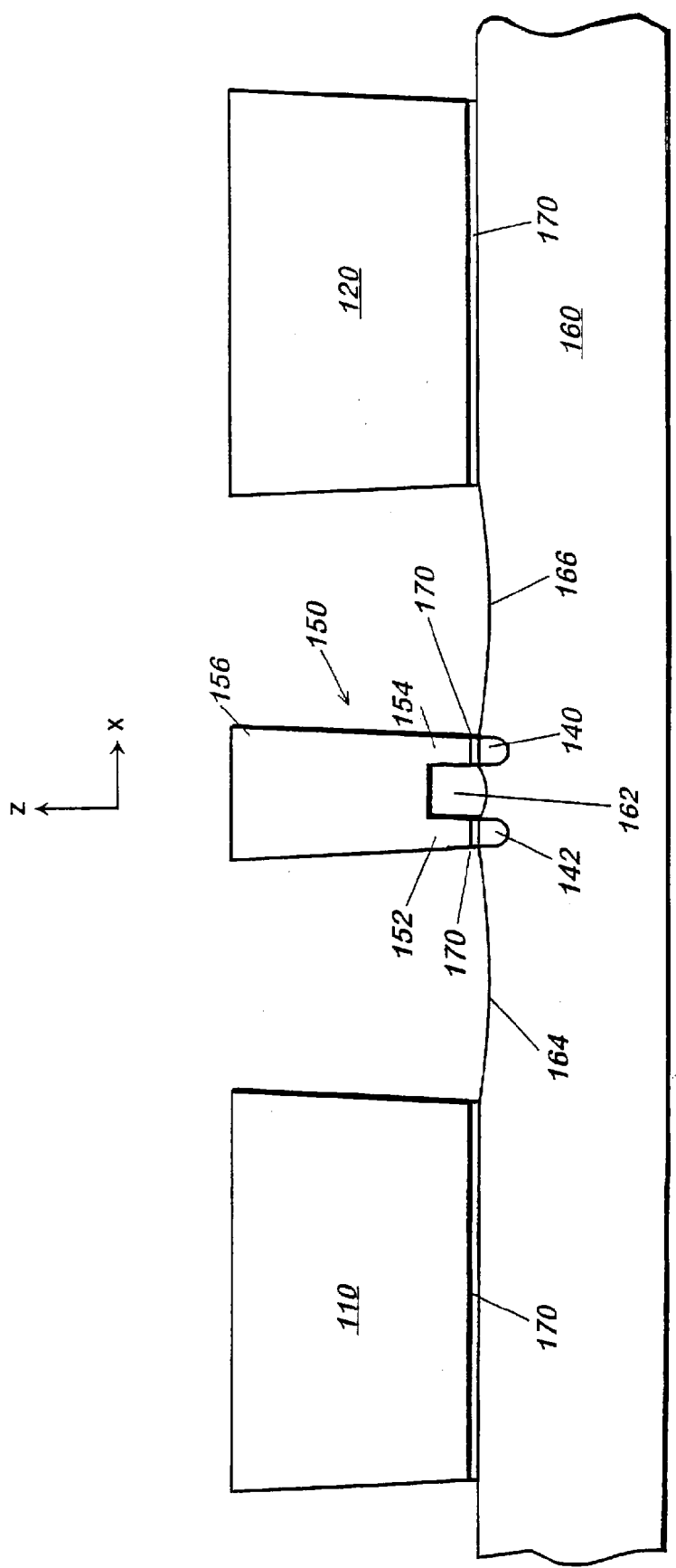
FIG. 2 is a cross-sectional view of the modulator of FIG. 1 at line A—A.

In the exemplary embodiment shown in FIGS. 1 and 2, the substrate 160 is z-cut lithium niobate, and the optical waveguide channels 140 and 142 are formed by high temperature indiffusion of a titanium that has been photolithographically defined.

The optical waveguides are formed in a pattern such that an input waveguide 132 is split at a y-branch 136 into two parallel waveguides 140 and 142, which are then recombined into a single output waveguide 134 by an output y-branch 138. In an alternative embodiment (not shown), each of the parallel waveguides 140 and 142 can be coherently combined using a directional coupler providing two separate outputs from the device, without the output y-branch 138 and output waveguide 130.

As seen in FIG. 2, a buffer layer 170 can be arranged between the z-cut lithium niobate substrate 160 and the electrodes 110, 120, and 150 at least in the areas that will underlie the electrodes. The buffer layer 170 can be silicon dioxide or other suitable material. If the substrate is x-cut lithium niobate, no buffer layer is necessary provided that the electrodes are beside the waveguides rather than on top of them. In another embodiment (not shown), the buffer layer 170 can also be disposed over the substrate 160 in the regions between the electrodes.

As illustrated in FIGS. 1 and 2, the ground electrodes 110 and 120 are arranged on either side of and spaced apart from the central active electrode 150. Details of suitable materials and suitable techniques for diffusing titanium into the substrate are found in commonly assigned U.S. Pat. No. 6,862,387.

A cross-sectional view of the active electrode is shown in FIG. 2, corresponding to the central linear active portion of the modulator between the turns. The active or hot electrode 150 is arranged over both of the parallel waveguides 140 and 142. The hot electrode 150 has a bridge configuration, with two lower portions 152 and 154 aligned preferably directly over the parallel waveguides 140 and 142. The hot electrode's lower portions 152 and 154 are approximately the same width as the parallel waveguides 140 and 142. The lower portions of the electrode 150 are separated by a distance that is approximately the same width as the distance between the optical waveguide channels 140 and 142. The space 162 can be empty (e.g., filled with air) or can be filled with an electrically insulating material preferably with a low dielectric constant.

The upper portion 156 of the bridge-shaped hot electrode 150 has a width approximately the same as the optical waveguides 140 and 142 plus the distance between the optical waveguides, and is aligned over and in physical contact with the lower portions of the electrode.

FIG. 1 shows the electrode 150 with the upper portion 156 cut away to illustrate the alignment of the electrode legs or lower portions 152 and 154 over the optical waveguide arms 140 and 142. In the region 144 where the optical waveguide arms are approximately linear and parallel, the lower parts of the electrode 150 are aligned over the optical waveguide arms.

The active electrode and ground electrodes are configured to match as closely as possible the velocity of the RF signal in the active electrode 150 and the velocity of the optical signal in the optical waveguide channels 140 and 142. For example, the overall width of the active electrode is not limited to the width of the optical waveguide, as in some conventional MZMs, but may be equal to the sum of the widths of the optical waveguides plus the edge-to-edge separation distance between the two optical waveguides. The larger size of the bridge electrode allows much wider gap spacing between the active center electrode 150 and the ground electrodes 110 and 120 than in conventional MZM designs. The wider gap spacing allows the electrodes to be made much thicker (in the z direction of FIG. 2), resulting in considerably lower electrical losses in the electrodes.

At either end of the active region 144, the two electrode legs 152, 154 that form the base of the electrode bridge 150 are recombined and preferably terminated with a resistor equal to the characteristic impedance of the transmission line. For an unamplified input signal, this configuration provides an additional $2^{1/2}$ direct improvement over an electro-optic modulator with one hot electrode over one waveguide and a ground plane over the over waveguide and an equivalent active modulation length.

In the exemplary embodiment of FIG. 1-2, an optical source such as a laser (not shown) provides optical energy into the optical waveguide input 132. The device of FIG. 1-2 is configured to receive optical energy at the 1.5 micron wavelength, however, optical energy at other wavelengths is also suitable. For example, optical energy at the 1.3 micron wavelength can be carried by the optical waveguide 132. The dimensions of the optical waveguide can also be adjusted to carry optical energy at longer or shorter wavelengths.

Figure 3:
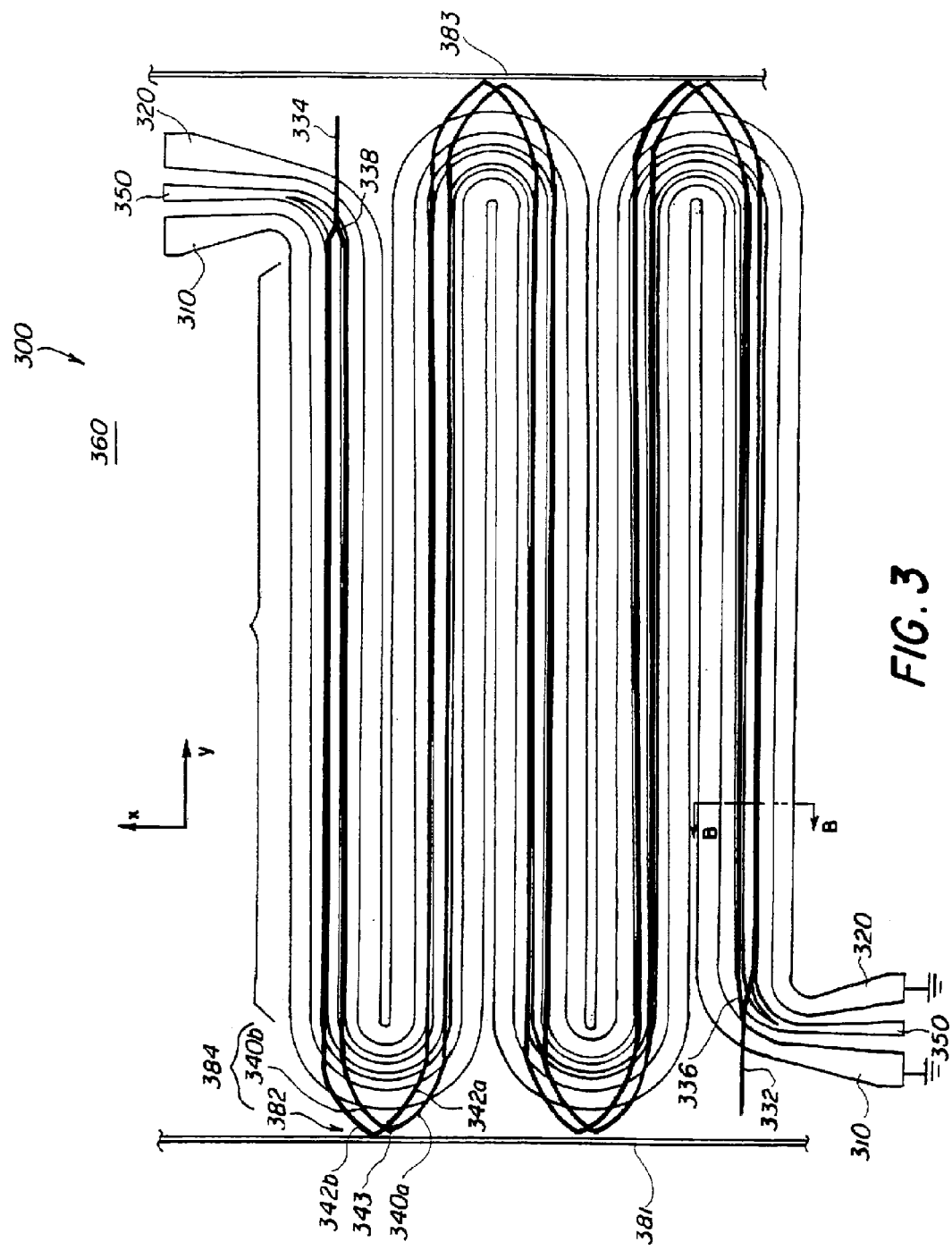
FIG. 3 is a cross sectional view of an electro-optic modulator according to a second embodiment of the invention.
Figure 4:
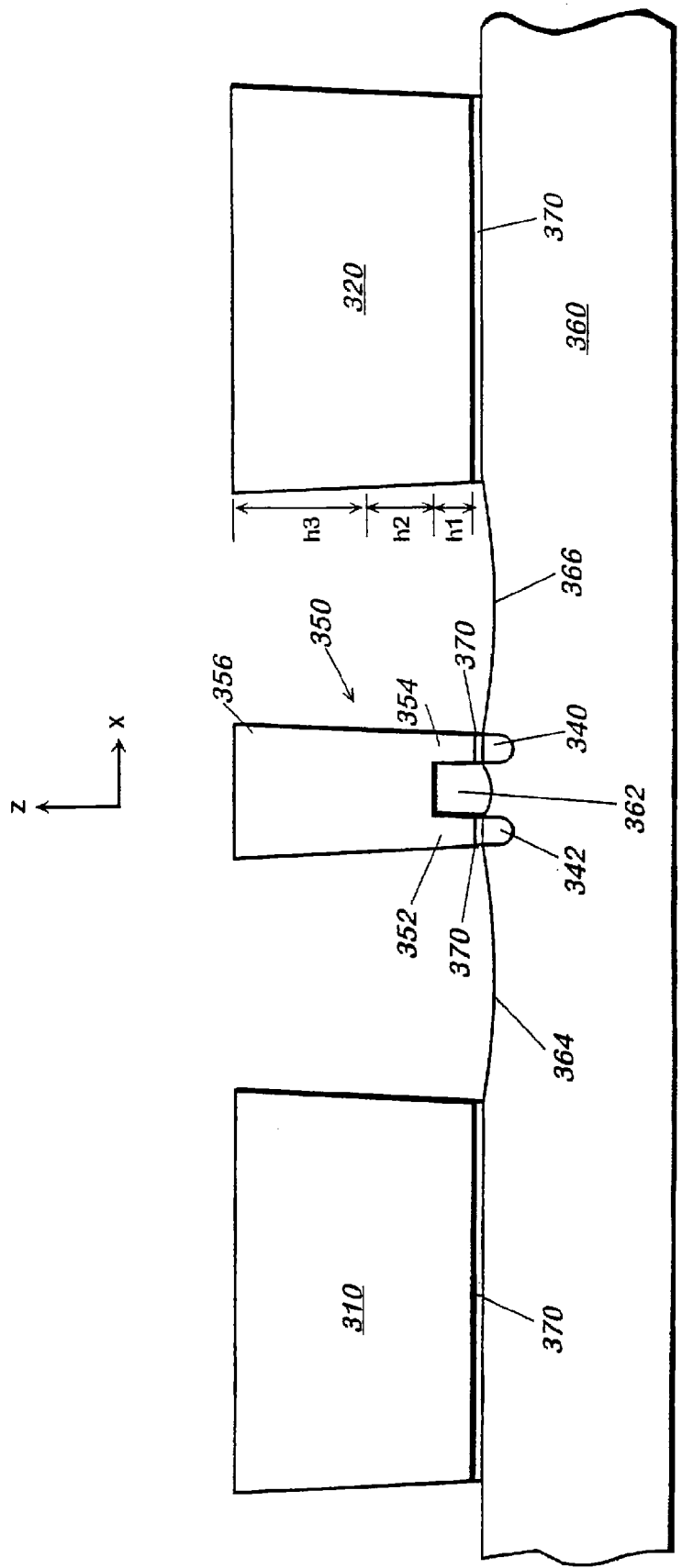
FIG. 4 is a cross-sectional view of the modulator of FIG. 3 in an active region at line B—B.
Figure 5:
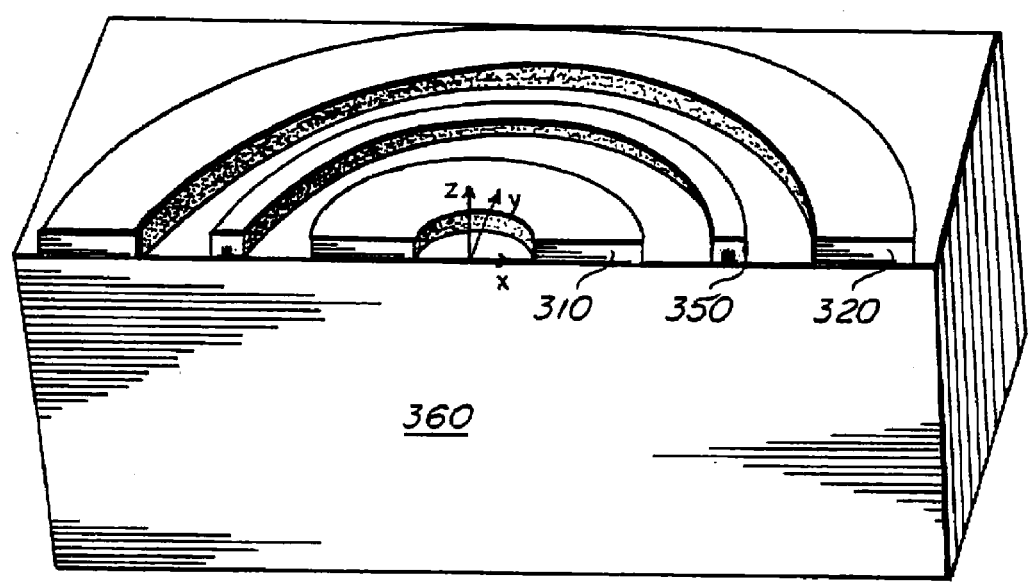
FIG. 5 illustrates a view of the electrodes in the bend region corresponding to FIGS. 3 and 4.

Another exemplary embodiment of an electro-optic modulator is illustrated in FIG. 3-5.

FIG. 3 illustrates a multiple-pass electro-optic Mach-Zehnder modulator 300 in accordance with another exemplary embodiment of the invention. The modulator 300 includes optical waveguides formed in a substrate and electrodes arranged to induce index changes in the optical waveguides. A single hot input electrode 350 receives a RF signal from a coplanar waveguide input horn.

The base layer of the hot input electrode 350 is split into two electrodes that pass over two optical waveguide arms of the modulator. The RF input signal induces index changes in the optical waveguides modulating the velocity of the propagating optical signals. One of the optical waveguide arms is reverse poled relative to the other waveguide arm. Thus, the in-phase RF input signal traveling through the electrodes induces opposite phase shifts in the optical waveguides. The electrode is designed such that the velocity of the RF signal traveling down the electrodes matches, as closely as possible, the velocity of the optical wave traveling within the waveguide under the electrode. Further details are provided in the following paragraphs.

As illustrated in FIG. 3, the active region is folded back and forth in order to increase the interaction length, resulting in a reduced drive voltage. The modulator 300 includes a long active modulation region 380 with five approximately linear portions in which the active electrode overlies the waveguide arms. Compact reflective waveguide turns 382 are provided at the ends of the linear portions, as disclosed in U.S. Pat. No. 6,862,387 and discussed in the following paragraphs.

The optical waveguides are formed in a pattern such that an input waveguide 332 is split at a y-branch 336 into two parallel waveguide channels 340 and 342. At the end of the optical waveguide opposite the input portion 332, the optical waveguide channels 340 and 342 each include a compact 180 degree waveguide s-bend turn. As illustrated in FIG. 3, the modulator 300 includes reflective surfaces 381 and 383 at the edges of the substrate 360 adjacent the optical waveguide turns 382. The reflective surfaces can be gold or dielectric mirrors, or any other suitable material with a high reflectivity at the wavelength of the optical energy carried by the optical waveguides.

As discussed in U.S. Pat. No. 6,862,387, reflective surfaces 381 and 383 can be formed on an edge of the substrate 360 which should be polished to a smooth surface before application of the reflective surface. Smoothness of the substrate edge in the vicinity of the optical waveguides should be about or better than 1/5 of the typical wavelength of 1.5 microns or about 0.3 microns. Waveguide portions 340a and 340b, for example, meet at an apex 343. As discussed in U.S. Pat. No. 6,862,387, the distance of the apex of the optical waveguide to the reflecting surface 381 in the y direction can be between 0 and plus or minus 14 microns. The optical waveguides 340 and 342 can be between about 50 to 500 microns apart, measured from the centerline of the optical waveguides, and should be sufficient to limit coupling via the evanescent wave effect between waveguide arms. The reflective surface 381 is not exactly at 90 degrees to the incoming light in the optical waveguide arms. The offset from 90 degrees can be below about 10 degrees, providing a compact modulator with more than one pass and therefore a longer active region. Reflective surfaces can also be formed by etching a groove in the substrate, and depositing a material that is highly reflective at the optical frequency, as discussed in U.S. Pat. No. 6,862,387.

Reflective surfaces can also be formed by etching a groove in the substrate, and making use of total internal reflection if the incident angle is sufficiently large.

Light in the optical waveguide arm 340a will propagate along the lower s-bend half and will be reflected by reflective surface 381, proceeding along the upper s-bend half to the optical waveguide arm 340b. Similarly, light in the optical waveguide arm 342a will propagate along the lower s-bend half and will be reflected by reflective surface 381, proceeding along the upper s-bend half to the optical waveguide arm 342b. After being reflected by the reflecting surfaces and modulated in the active regions 380 between the compact s-bend turns, the signals in the optical waveguide arms will be recombined at the output y-branch 338 and will exit the modulator through output waveguide 334. In an alternative embodiment (not shown), each of the parallel waveguides 340 and 342 can be coherently combined using a directional coupler providing two separate outputs from the device, without the output y-branch 338 and output waveguide 334.

In the active regions 380 of the modulator, the optical waveguide arms 340 and 342 follow the path of the electrodes 310, 320, and 350. Compact reflective waveguide turns in the bending regions allow compact spacing of the adjacent active regions in the x-direction. In alternative embodiment (not shown), the optical waveguides can follow can follow a semicircular path in the bending regions, however, this would require several times more space to contain the same number of active regions or transition to a high index gradient waveguide.

The substrate 360 is preferably formed of a crystalline material having a high electro-optic coefficient such as lithium niobate or lithium tantalate. Other suitable materials include barium titanate, strontium barium niobate, a polymer, indium gallium arsenide phosphide, indium phosphide, gallium arsenide, and gallium aluminum arsenide. In the exemplary embodiment shown in FIGS. 3 and 4, the substrate 360 is z-cut lithium niobate, and the optical waveguide channels 340 and 342 are formed by high temperature indiffusion of a titanium that has been photolithographically defined.

As illustrated in FIGS. 3 and 4, the ground electrodes 310 and 320 are arranged on either side of and spaced apart from the centrally arranged hot or active electrode 350. A cross-sectional view of the active electrode 350 is shown in FIG. 4, corresponding to the central linear active portion of the modulator between the turns. The active or hot electrode 350 is arranged over both of the parallel waveguides 340 and 342. The hot electrode 350 has a bridge configuration, with two lower portions 352 and 354 aligned preferably directly over the parallel waveguides 340 and 342 in the linear portions of the active region. As illustrated in FIG. 4, the hot electrode's lower portions 352 and 354 are approximately the same width as the parallel waveguides 340 and 342. The lower portions of the electrode 350 are separated by a distance that is approximately the same width as the distance between the optical waveguide channels 340 and 342. The space 362 can be empty (e.g., filled with air) or can be filled with an electrically insulating material preferably with a low electro-optic coefficient.

As illustrated in FIG. 4, the upper portion 356 of the bridge-shaped hot electrode 350 has a width approximately the same as the optical waveguides 340 and 342 plus the distance between the optical waveguides, and is aligned over and in physical contact with the legs or lower portions of the electrode. The electrode can be formed in two or more steps, with a base layer being deposited first to form the lower electrode portions, and the upper portion of the electrode being formed of subsequently applied layer or layers of metallization. The upper portion 356 of the hot electrode 350 can have a width approximately equal to the widths of the electrode legs plus the gap between the legs, as seen in FIG. 4. The upper portion must be in electrical contact with the electrode base portions, although it is not necessary that the upper portion of the electrode be precisely aligned over the electrode base portions. The width of the upper portion can be slightly less than the widths of the electrode legs plus the gap between the legs. The width of the upper portion can also be greater than the widths of the electrode legs plus the gap between the legs, as seen in the electrode embodiments illustrated in FIG. 13A-B.

FIG. 3 shows the electrode 350 with the upper portion 356 cut away to illustrate the alignment of the electrode legs or lower portions 352 and 354 extending over and aligned with the optical waveguide arms 340 and 342 in the parts of the active region 380 where the optical waveguides are approximately linear and parallel.

A buffer layer 370 can be arranged between the z-cut lithium niobate substrate 360 and the electrodes 310, 320, and 350 at least in the areas that will underlie the electrodes. The buffer layer 370 can be silicon dioxide or other suitable material. If the substrate is x-cut lithium niobate, no buffer layer is necessary. The buffer layer 370 can also be disposed over the substrate 360 in the regions between the electrodes.

The electrode structure may be terminated with a resistor with the characteristic impedance of the transmission line.

The active electrode and ground electrodes are configured to match as closely as possible the velocity of the RF signal in the active electrode 350 and the velocity of the optical signal in the optical waveguide channels 340 and 342 in the linear region between the turns. For example, the overall width of the active electrode is not limited to the width of the optical waveguide, as in some conventional MZMs, but can be equal to about twice the width of the a waveguide plus the edge-to-edge separation between the two waveguides, or greater. The larger size of the bridge electrode allows much wider gap spacing between the active center electrode 350 and the ground electrodes 310 and 320. The wider gap spacing allows the electrodes to be made much thicker (in the z direction), resulting in lower electrical losses in the electrodes.

The surface of the substrate 360 can be removed by etching or other suitable removal technique in the gaps between each ground electrode 310, 320 and the hot electrode 350. The substrate surface can also be removed in the space 362 between the two lower portions of the active electrode 350. FIG. 4 illustrates that the in the linear part of the active region of the modulator, the upper surface of the lithium niobate substrate 360 has been removed by etching in the space 362 between the active electrode legs 352, 354 and in the region 364, 366 between the ground electrodes 310, 320 and the active electrode 350. Removing a portion of the substrate appears to improve the velocity matching between the RF and optical signals by increasing the velocity of the RF signal in the active electrode. Removal of a portion of the substrate also can affect the impedance of the electrode. The bridge electrode, when optimized to match the RF and optical velocities, has a characteristic impedance lower than 50 ohms without etching.

Etching the substrate surface in the bend regions is difficult to accomplish without damaging the optical waveguide crossings near the reflective s-bends. To impedance match the bridge electrode in the turning region, the height of the electrode is reduced to a height less than the height in the linear active region to obtain 50 ohms without etching the lithium niobate substrate. For example, when the bridge electrode height is 90 microns in the linear part of the modulator, the bridge electrode height in the turning region is 30 microns thick. The reduced height of the electrodes in the bending region, however, can cause a mismatch between the velocities of the RF and optical signals. Therefore, the physical lengths of the optical waveguides and the electrodes are selected to match the total transit time of the optical and electrical signals through the bend region, ensuring they are in phase as they transition through the turn into the next linear active region. A three dimensional electromagnetic model can be used to determine the appropriate lengths of the optical waveguides and electrodes in the bend region and linear active regions. FIG. 5 illustrates the bridge electrode 350 and the ground electrodes 310 and 320 in the turning region of the modulator.

The side walls of the electrodes can be perpendicular to the substrate, or can be slightly flaring outward so the upper portion of the electrodes are wider than the lower portions, as illustrated in FIGS. 2 and 4. The upper portion of the electrode side walls could also be narrower than the lower portion (not shown).

In an alternative embodiment (not shown), the optical waveguides underlie the hot electrode even in the bend region, and reflective s-bends are not provided at the edges of the substrate. This embodiment, while having the advantage that etching can be performed between the electrodes without harming the optical waveguides, does not include compact turns, so requires more space on the substrate.

Modulators based on x-cut lithium niobate have typically been limited to a lower frequency range than modulators based on z-cut lithium niobate because for x-cut modulators the optical waveguides must go between the electrodes to utilize the larger electro-optic coefficient, r33. This limits the electrode gap width. Narrow gap widths require a shorter electrode height for velocity matching which in turn results in higher losses than experienced for the tall electrodes allowed for z-cut devices. As a result for x-cut devices there is a trade-off between higher drive voltage $V\pi$ and frequency response. However, for applications in which the frequency range and drive voltage are not critical, the bridge electrode described herein can be included in x-cut lithium niobate based modulators. For such modulators, the lower portions of the bridge electrode can be arranged on either side of a waveguide, rather than directly aligned over the optical waveguide arms.

The following is a description of a suitable method for forming the electro-optic modulators of FIG. 1-5. A substrate is suitably selected as a z-cut optical-grade commercial lithium niobate wafer. The z plane is the plane perpendicular to the crystal axis (z) and is the largest face of the substrate. The wafer can be approximately 3-4 inches in diameter with a 1 mm thickness, although larger or smaller size wafers can be used. The wafer is cleaned in trichloroethylene, acetone, methanol, detergent, and deionized water. Titanium is sputtered at room temperature over the z face to a thickness of 600 angstroms. Optical waveguides can be formed in the substrate photolithographically by spin-coating photoresist on the substrate, prebaking the photoresist at 90 degrees C. for 25 minutes, exposing the photoresist to UV light through the optical waveguide photomask, with the optical waveguides aligned along the y-axis of the substrate. The photoresist is then developed to eliminate it, and post-baked at 110 degrees C. for 45 minutes to fully harden it in the optical waveguide regions. Finally, the titanium, is etched away by the use of ethylene diamine tetraacetic acid (EDTA). The final titanium strip width after etching is 8 um and produces single-mode waveguides after indiffusion of titanium. The substrate is then placed in a furnace and heated to an elevated temperature of 1000 degrees C. for 10 hours in wet oxygen. This technique produces high quality optical waveguides with very low propagation losses in straight channels, for example, losses of approximately 0.1 dB/cm.

A poling mask is used to define a poling electrode over one of the two waveguide regions. A voltage is applied to the poling electrode to reverse the ferroelectric domains in only one of the two waveguides. The net effect of this poling is a reduction in modulator drive voltage. After reverse poling is completed, the poling electrode is chemically etched away. An etch mask is then used to define the areas on the substrate that are to be etched by ion milling or another suitable technique. The lithium niobate ridge (unetched area) can be slightly wider than the electrode footprint, for example, to minimize optical loss in the active region associated with roughness of the etched surface.

A buffer layer of silicon dioxide is deposited over the wafer after etching of the substrate. Alternatively, the buffer layer can be deposited prior to etching.

The layering process for the electrodes is illustrated by FIG. 4. A first modulator electrode mask is used to define the foundation (lower portion or legs) of the bridge electrode, and a first layer of the ground planes. The electrodes are plated everywhere to a height h1 of 20 microns. In a preferred embodiment, the electrodes are formed of gold. For structural support, the volume between the legs of the bridge electrode can be filled with a polymer or other suitable material before the upper layer is applied.

A second modulator mask is used to define the center hot electrode and all other electrodes, and the electrodes are plated to an additional height h2 of 10 microns. This completes the formation of the 30 micron electrode height in the turning region.

A third modulator mask is used to form the mold for the linear part of the modulator between the turns, where the hot electrode and the ground planes are plated with another 60 microns of electrode material (h3), for a total of 90 microns in height (in the z direction).

The input and output horns couple RF input energy to the first active region and from the last active region of the modulator. The input and output horns can have a thickness of approximately 20 microns. In this embodiment, the horns are not impedance matched. Their length is less than the wavelength of the RF energy, so impedance matching is not necessary. The impedance, effective refractive index, and gold thickness in microns of the FIG. 3-5 embodiment is as follows:

|  | Z (ohms) | n eff | gold thickness | characteristics |
|---|---|---|---|---|
| linear active region | 48 | 2.14 | 90 microns | velocity and impedance matched |
| turns | 48 | 3.41 | 30 microns | impedance matched |
| horns (RF to active) | 38 | 2.6 | 20 microns | not impedance matched |

A significant advantage of the modulators described herein is that they are inherently chirp-free. For a Mach-Zehnder modulator, chirp is the ratio of the phase modulation to the amplitude modulation where the phase modulation is the time averaged phase modulation for both waveguides in the Mach-Zehnder modulator. Previous Mach-Zehnder modulators that apply different electrical fields to the two waveguide arms are susceptible to chirp due to the differential in the electric field applied to each electrode over the two waveguides. In MZMs with one electrode at ground potential (zero electrical field) and the other electrode at the maximum applied voltage, the optical waveguide under the grounded electrode has only a small contribution to the average phase while the other optical waveguide has most of the modulation phase shift.

In contrast, the electrode bridges configurations disclosed herein and illustrated in FIG. 1-5 allows the same electrical field to be applied to both waveguides. Therefore, the magnitude of the optical signal's phase shift is the same in each waveguide. Since one of the optical waveguides is reverse poled, the sign of the phase modulation in one of the optical waveguides is reversed relative to the other waveguide. This results in a time averaged phase modulation of zero for equal length waveguides. Thus, the bridge structure electrodes are inherently chirp-free.

Another advantage of the electrode configuration disclosed herein is that the fabrication tolerances for the bridge structure are reduced compared to coplanar waveguide structures. Although more masks are used to define the bridge structure, only the bottom electrode layer of 20 μm requires precise alignment during the photolithography stage. In contrast, other low-loss coplanar waveguides not having a bridge structure require thicker electrodes in a single step (e.g., greater than 40 microns), making the alignment during the photolithography process much more difficult.

For a number of modulator applications a modulator drive voltage of 0.5 V or less is desirable. Further, operation without a low noise amplifier between the electrical source (such as an antenna) and the modulator can be desirable due to a lack of electrical power locally, to minimize local power consumption, or to eliminate distortion products created by the nonlinearities of the amplifier. For example, with drive voltages of 0.5 V or less, microwave transmission from antennas can be accomplished without any amplifier at the antenna and with RF gain in the fiber optic link and noise figure of the same order as a low noise amplifier.

Figure 6:
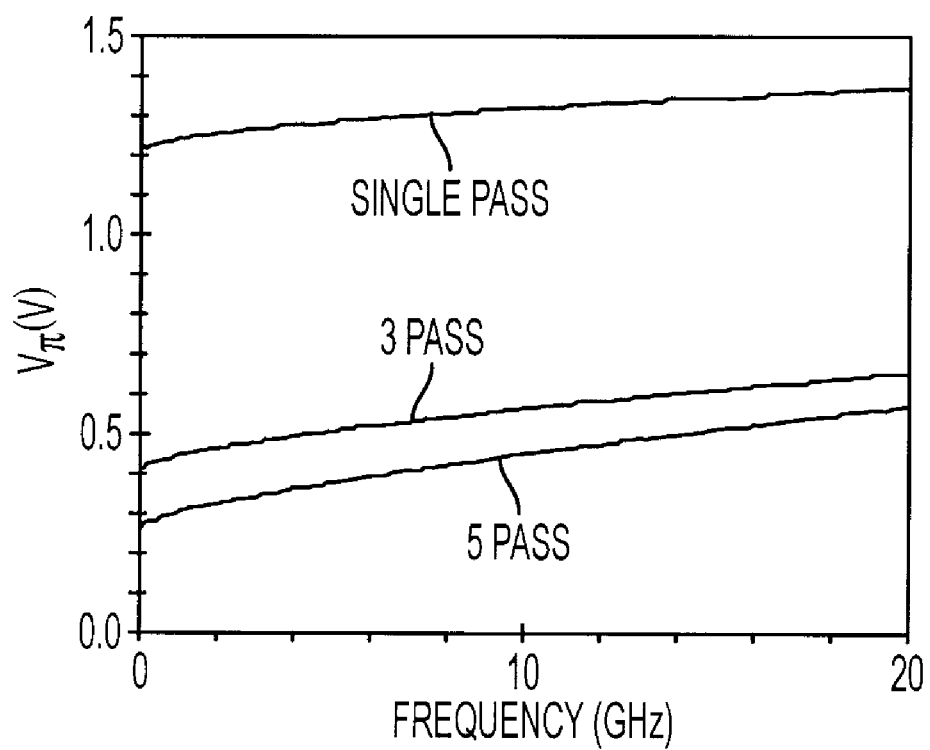
FIG. 6 is a graph illustrating projected drive voltage versus frequency for bridge electrodes according to embodiments of the invention.

FIG. 6 and the following table illustrate the projected drive voltage for single pass and multi-pass modulators using the bridge electrode configuration described herein. The modulator illustrated in FIG. 3-5 having a low-loss bridge electrode structure, five active regions, and compact waveguide turns provides a Lithium niobate Mach-Zehnder modulator design with a projected drive voltage of 0.6 V or less through 20 GHz. The modulator illustrated in FIG. 1-2 and 3-5 are projected to have a drive voltage of 1.4 V or less through 20 GHz.

Model at 1.55 Micron Optical Signal Wavelength:

| | Vπ (V) | | | |
|---|---|---|---|---|
| Passes | DC | 10 GHz | 20 GHz | Interaction Length (cm) |
| 1 | 1.2 | 1.33 | 1.4 | 7.4 |
| 3 | 0.4 | 0.55 | 0.67 | 23.4 |
| 5 | 0.2 | 0.4 | 0.57 | 39.4 |

Achieving the low drive voltage over the 0-20 GHz frequency range is very useful for applications where amplifiers cannot be used between the RF source and the modulator, particularly where weight, size, power dissipation and power consumption are issues. Further, by eliminating amplifiers in RF systems, the lack of amplifier noise and distortion generated by the inter-modulation products of the amplifier improves the sensitivity of the RF system. System applications include wing mounted antenna array telemetry, space based systems and commercial and military telecommunication systems in which significant cost savings can be achieved while increasing reliability. With drive voltages of less than 0.5 V, microwave signals from antennas can be received without any amplifier at the antenna and transmitted over optical fiber with RF gain in the link and noise figure of the same order as a low noise amplifier.

The modulators and electrodes of FIG. 1-5 are also suitable for modulation at frequencies greater than 20 GHz.

The following discussion is provided to clarify the advantages of providing a single electrode with reverse poled waveguides compared to other modulator types. Four possible configurations of a single pass modulator are as follows:

1) a hot electrode over one waveguide with no electrode over the other waveguide;
2) a hot electrode over one waveguide with a ground plane over the other waveguide;
3) a hot electrode over one waveguide with a second hot electrode over the other waveguide, operating with two electrical driving signals which are 180 degrees out of phase; and
4) a hot electrode over one waveguide with a second hot electrode over the other waveguide operating with either a single electrical signal or two electrical driving signals in phase. The optical waveguide under one electrode is reverse poled to change the sign of the modulation.

Push-pull is a method of combining two signals that are out of phase to get more modulation effect between the two waveguides forming the Mach-Zehnder interferometer. The push pull method can be implemented through electrode or optical design. The electrode configurations of (3) and (4) are referred to as push-pull. Electrode designs consistent with configuration (2) can also provide a small increase in modulation efficiency compared with configuration (1) due to non-negligible field intensity under the ground electrode. It should also be noted that the push-pull configurations (3) and (4) are sometimes erroneously considered to provide twice the modulation due to the push-pull configuration. In the case of a RF source without amplification, the power must be divided between the two electrodes. Since these modulators respond to the voltage developed across the electrodes, the maximum improvement over configuration (1) modulators is $2^{1/2}$ for typical 50 ohm systems rather than a full factor of 2.

For applications where there is no amplifier between the RF driving source and the modulator, configurations (2) and (4) are the most promising. Configuration (1) has the poorest effective response of all configurations and configuration (3) requires a wideband power divider and a low-loss 180 degree RF phase shifter.

In order to maximize the modulator bandwidth and response, traveling wave modulator designs are employed or device length is shortened at the expense of increased drive voltage requirements. The modulators are designed such that the velocity of propagation of the optical wave is matched to the velocity of the microwave by adjusting the geometry of the electrode. For high frequency traveling wave modulators, as the active region length is increased to reduce the dc drive voltage, the impact of increased electrode losses becomes more significant, causing the response to deteriorate rapidly at high frequency. Therefore, in order to take advantage of increased active region length enabled by compact reflective turns, extremely low loss electrode structures are desired. The electrode designs described in this disclosure can provide losses which are lower than conventional structures, ultimately enabling less than 0.5 V drive voltages.

Figure 7:
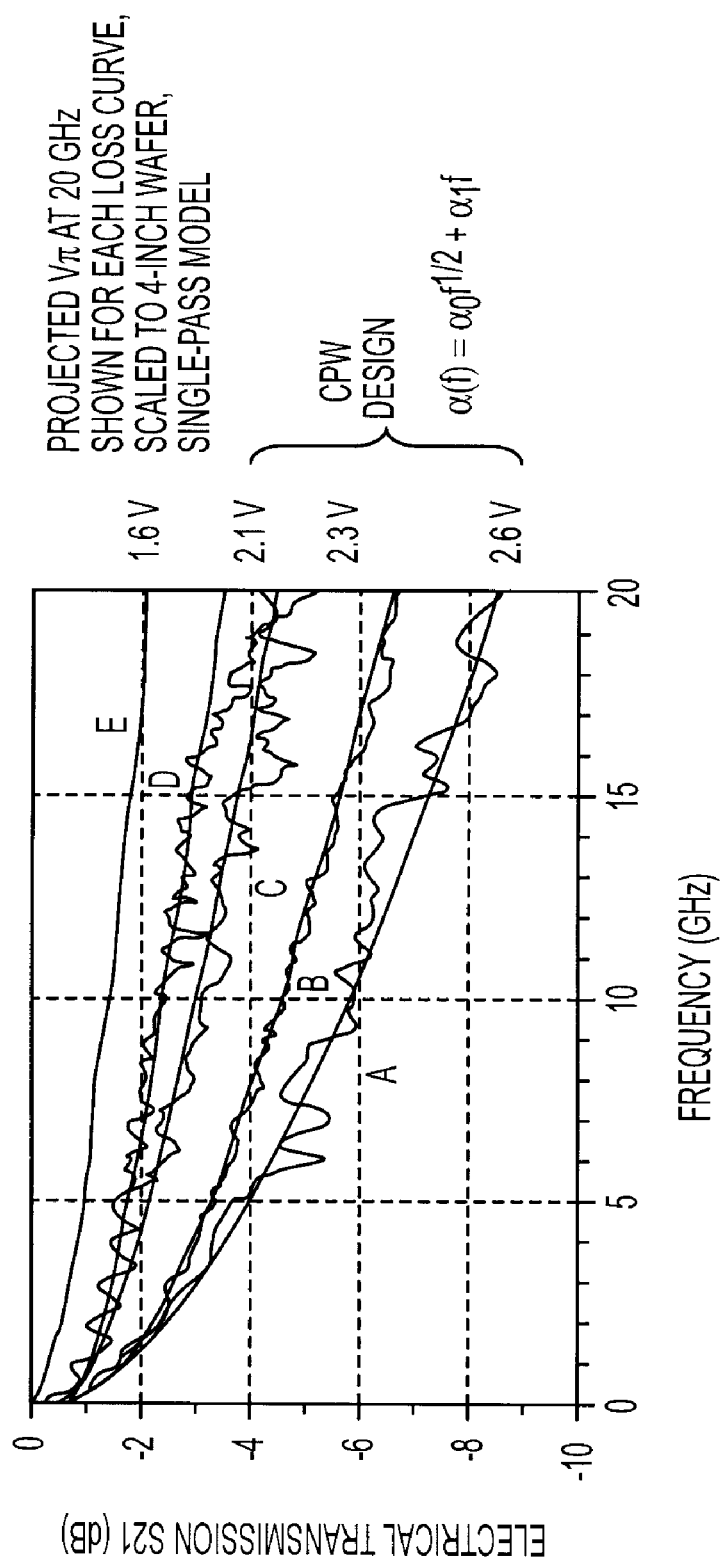
FIG. 7 is of electrode transmission versus frequency for coplanar waveguides and for bridge electrodes in accordance with an embodiment of the invention.

FIG. 7, a graph of electrode transmission versus frequency, illustrates that the bridge electrodes as illustrated in FIGS. 2 and 4 provide substantially reduced loss over other coplanar waveguide designs. Curves A show measured results for a single pass modulator with a 4.5 cm interaction length coplanar waveguide electrodes, a 25 micron gap, and a 32 micron height. Further details are provided in M. M. Howerton, R. P. Moeller, A. S. Greenblatt, and R. Krahenbuhl, "Fully packaged Broad-band LiNbO3 Modulator with Low Drive Voltage,", IEEE Photon. Technol. Lett. 12, 792-794 (2000), and fitted loss coefficient of 0.043 $(GHz^{1/2}\text{-cm})^{-1}$ for this modulator. Curves B represent a modulator with improved coplanar waveguide electrode morphology, resulting in a loss coefficient of 0.025 $(GHz^{1/2}\text{-cm})^{-1}$. Curves C represent measured and curve fitted results for a modulator with a coplanar waveguide gap width of 45 microns and electrode height of approximately 45 microns. The loss coefficient for this modulator is $\alpha_0 = 0.015$ $(GHz^{1/2}\text{-cm})^{-1}$. The height for this electrode was slightly short of that appropriate for velocity matching for the curve C modulator.

Curves D of FIG. 7 shows the electrical transmission for the bridge structure disclosed herein with a 90 micron electrode height in the active region, without etching between the lower portions of the active electrode, and without etching between the active electrode and the ground planes. The fitted curve D corresponds to a loss coefficient of 0.008 $(GHz^{1/2}\text{-cm})^{-1}$.

Further reductions in electrode losses of CPW structures are possible by increasing the electrode gap between the center electrode and the ground plane of coplanar waveguide electrodes and increasing the thickness of the electrode. Curve E represents the projected loss of an optimized bridge design with etching, calculated using a three dimensional finite element model. The projected loss coefficient is 0.065 $(GHz^{1/2}\text{-cm})^{-1}$, which includes both resistive and dielectric contributions.

Thus, the bridge electrode design disclosed herein provides a substantial reduction in electrode loss compared to other coplanar waveguide designs shown in FIG. 7.

FIG. 8 illustrates the electrode loss versus electrode gap for coplanar waveguide structures. As the gap is increased, the electrode height should also be increased to ensure that the optical velocity and RF velocity are matched. FIG. 9 illustrates the electrode transmission versus frequency for coplanar waveguide structures. FIG. 10 illustrates the loss coefficient, dc drive voltage Vπ (DC) and 20 GHz drive voltage Vπ (20 GHz). As illustrated in FIGS. 9 and 10, drive voltages of less than 0.5 V at 20 GHz are not feasible for the configuration (2) coplanar waveguide.

As the modulators illustrated in FIG. 1-4 each have reverse-poled waveguide arms and a single hot electrode, they correspond best to the configuration (4) structure discussed in previous paragraphs. Thus, the FIG. 1-4 modulators provide significant advantages over coplanar waveguide structures.

Figure 11:
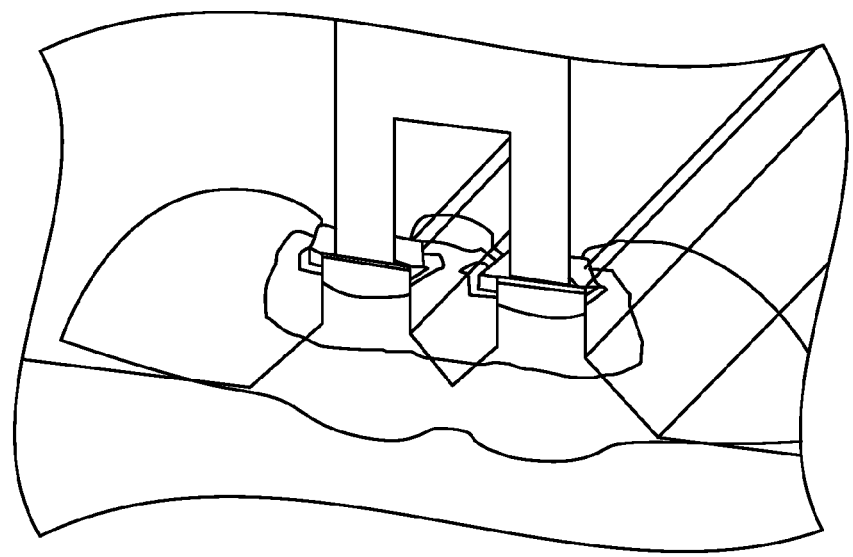
FIG. 11 is an expanded view of the bridge electrode according to FIG. 2 or 4.
Figure 12:
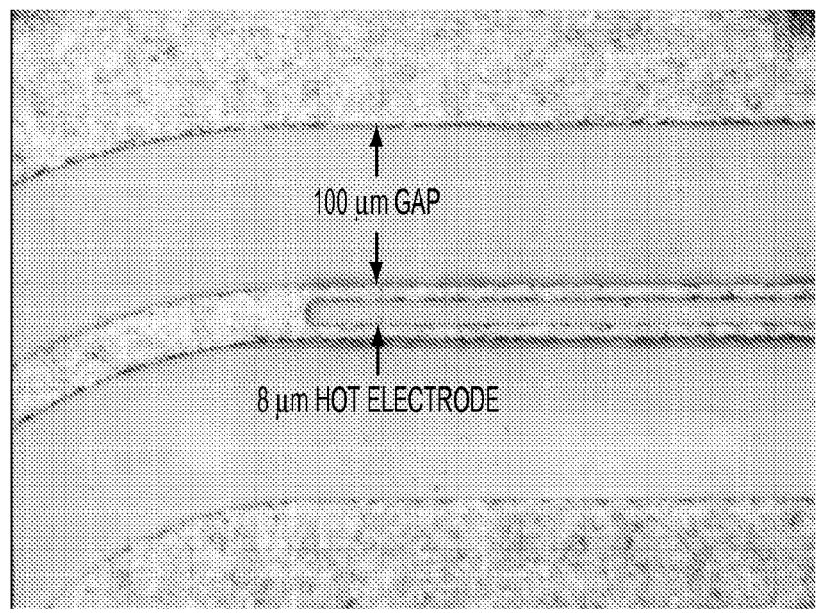
FIG. 12 illustrates a lower level of a bridge electrode according to an embodiment of the invention.

FIG. 11 is an expanded view of the substrate and bridge structure of FIG. 2 or 4. FIG. 12 illustrates the first layer of metallization forming the base level of an active electrode 150 or 350 shown in FIG. 1-2 or 3-5. The active electrode 150 is spaced apart from each ground plane by 100 microns, and each of the electrode legs is 8 microns in width. The two optical waveguides should be separated enough to limit optical crosstalk. Deep ion etching as illustrated in FIG. 11 can limit crosstalk between the optical waveguides while minimizing the gap between the optical waveguides.

The upper portion of the active bridge electrode can extend in the width direction beyond the outer edges of the electrode base layer. A large surface area is preferred for decreasing the loss in the electrode.

Figure 13A:
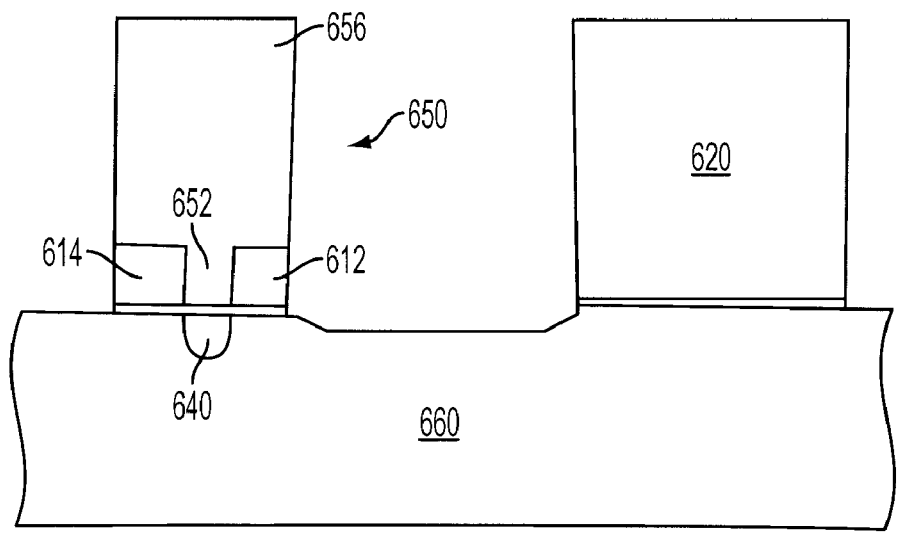
FIG. 13A-B are cross sectional views of an electro-optic phase modulator according to an embodiment of the invention.
Figure 13B:
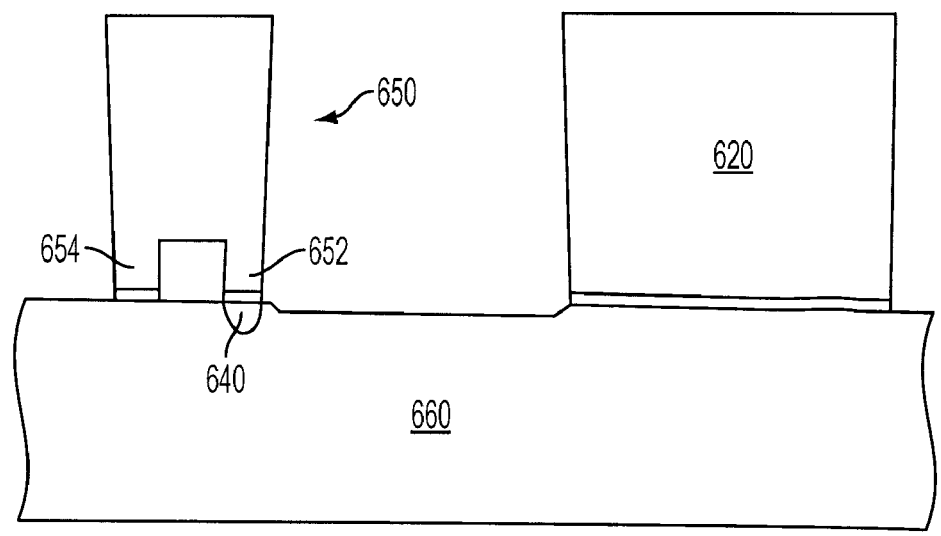

FIG. 13A-B illustrate cross sectional views of an electro-optic phase modulator according to another embodiment of the invention. An optical waveguide 640 is formed in a substrate 660 by the titanium indiffusion method described above, or by another suitable method. An electrode 650 and ground plane 610 are formed on the substrate. The hot electrode is spaced apart from a ground plane 610. As seen in FIG. 13A, the electrode 650 has a lower portion 652 aligned with the optical waveguide 630 in a manner such that applying a RF signal to the electrode induces a change in the refractive index of the optical waveguide, in turn producing a velocity matched optical signal in the optical waveguide. The lower portion 652 preferably has a width about the same as the width of the optical waveguide. The upper portion 656 of the electrode is wider than the lower portion, and preferably is at least twice, and more preferably, at least three times as wide as the lower portion. For example, a presently preferred width for the upper portion of the electrode is 32 microns when the lower portion is 8 microns wide, with the electrode having a total height of 90 microns. A polymer or other suitable electrically insulative material can be deposited on the substrate in the areas 612 and 614 on either side of the lower portion of the electrode to provide a stable platform on which to deposit the subsequent layer or layers of the electrode.

As seen in FIG. 13B, the electrode can also have more than one lower portion to provide a stable base for the subsequently deposited layers of the electrode. In this embodiment, only one of the lower portions 652 will be aligned over the waveguide.

Obviously, many modifications and variations of the present invention are possible in light of the above teachings. It is therefore to be understood that the claimed invention may be practiced otherwise than as specifically described.

What is claimed is:

1. An electro-optic modulator comprising:
 a substrate having at least two parallel optical waveguides formed on a first face of the substrate;
 at least one active electrode formed on the first face of the substrate;
 the active electrode having at least two lower portions spaced apart from each other and an upper portion, the upper portion joining the two lower portions and extending over the two parallel optical waveguides, the lower portions being arranged between the upper portion and the substrate, each of the two lower portions of the active electrode extending over one of the two parallel optical waveguides and operating to induce a refractive index change in the optical waveguide under that electrode portion.

2. The electro-optic modulator of claim 1, further comprising at least one ground plane formed on the first face of the substrate and spaced apart from the active electrode.

3. The electro-optic modulator of claim 2, wherein the at least one ground plane comprises a first ground plane on one side of the active electrode and a second ground plane arranged on a side of the active electrode opposite the first ground plane.

4. The electro-optic modulator according to claim 2, wherein the gap between the active electrode and the ground plane is about 100 microns.

5. The electro-optic modulator according to claim 3, wherein the ground planes have a width of at least 150 microns.

6. The electro-optic modulator of claim 1, wherein a gap between the spaced apart lower portions of the active electrode is filled with an electrical insulator.

7. The electro-optic modulator of claim 1, wherein the gap between the spaced apart lower portions of the active electrode is filled with a polymer.

8. The electro-optic modulator of claim 1, wherein an upper portion of the active electrode has a width about equal to the width of the optical waveguides plus the width of the gap between the optical waveguides.

9. The electro-optic modulator of claim 1, wherein the active electrode has a height at least five times as large as the width of a lower portion.

10. The electro-optic modulator of claim 1, wherein each lower portion is about eight microns wide.

11. The electro-optic modulator of claim 1, wherein one of the two optical waveguides is reversed poled compared to another of the two optical waveguides.

12. The electro-optic modulator of claim 1, wherein the modulator has approximately zero chirp.

13. The electro-optic modulator of claim 1, wherein the two optical waveguides are joined at their ends by a y-branch.

14. The electro-optic modulator of claim 1, wherein the substrate comprises at least one of lithium niobate and lithium tantalate.

15. The electro-optic modulator of claim 1, wherein the substrate comprises z-cut lithium niobate.

16. The electro-optic modulator of claim 1, further comprising a buffer layer formed on the substrate between the optical waveguides and the electrodes.

17. The electro-optic modulator of claim 16, wherein the buffer layer comprises silicon dioxide.

18. The electro-optic modulator of claim 1, wherein the parallel optical waveguides comprise titanium.

19. The electro-optic modulator of claim 1, further comprising at least one groove in the substrate between the optical waveguides.

20. The electro-optic modulator of claim 1, further comprising at least one groove in the substrate between the active electrode and the ground plane.

21. The electro-optic modulator of claim 1, further comprising an active region and a bend region, the bend region having a reflector for reflecting optical energy in the optical waveguide.

22. The electro-optic modulator of claim 21, the active electrode and the ground plane having a thickness in the bend region less than a thickness in the active region.

23. The electro-optic modulator of claim 1, wherein the optical waveguides, the active electrode, and the ground plane extend from an active region into a bend region, the electrodes being velocity matched to the optical waveguides in both the bend region and the active region.

24. The electro-optic modulator according to claim 23, wherein the modulator comprises at least two bend regions.

25. The electro-optic modulator according to claim 23, wherein the modulator comprises at least three bend regions.

26. The electro-optic modulator according to claim 23, wherein the modulator comprises at least four bend regions.

27. The electro-optic modulator according to claim 23, wherein the substrate is etched in the active region and is not etched in the bend region.

28. The electro-optic modulator according to claim 1, wherein the modulator is a Mach-Zehnder modulator.

29. The electro-optic modulator according to claim 1, wherein the active electrode has a width in its upper portion about equal to the widths of the spaced apart lower portions plus the distance between the lower portions.

30. The electro-optic modulator according to claim 1, wherein the active electrode has a width in its upper portion at least as large as the widths of the spaced apart lower portions plus the distance between the lower portions.

31. The electro-optic modulator according to claim 1, wherein the active electrode has a width of about 32 microns.

32. The electro-optic modulator according to claim 1, wherein the active electrode has a height greater than its width.

33. The electro-optic modulator according to claim 1, wherein a center-to-center distance of the optical waveguides is about 24 microns and the interior edge-to-edge distance between the optical waveguides is about 16 microns, with a waveguide width of 8 microns in an active region of the modulator.

34. The electro-optic modulator of claim 1, wherein each of the two lower portions of the active electrode overlie one of the optical waveguides in an active region of the modulator.

35. The electro-optic modulator according to claim 1, further comprising: at least one ground plane formed on the first face of the substrate spaced apart from the active electrode.

36. The electro-optic modulator according to claim 1, further comprising:

ground planes formed on opposite sides of the active electrode, spaced apart from the active electrode.

* * * * *